United States Patent [19]

Ciaccia et al.

[11] 4,257,842

[45] Mar. 24, 1981

[54] PREPARING PERMANENTLY EMBOSSED, HIGHLY POROUS WALLPAPERS

[75] Inventors: Vittorio Ciaccia; Paolo Parrini, both of Ferrara, Italy

[73] Assignee: Montedison S.p.A., Milan, Italy

[21] Appl. No.: 49,088

[22] Filed: Jun. 18, 1979

Related U.S. Application Data

[62] Division of Ser. No. 808,570, Jun. 21, 1977, abandoned.

[30] Foreign Application Priority Data

Jun. 22, 1976 [IT] Italy .............................. 24557 A/76
Aug. 18, 1976 [IT] Italy .............................. 26334 A/76

[51] Int. Cl.³ ........................ D21H 5/20; D21H 5/00; B29C 17/00

[52] U.S. Cl. .................................... 162/117; 162/146; 162/205; 162/206; 264/119; 264/154; 264/284; 264/DIG. 47

[58] Field of Search ....... 264/284, 293, 119, DIG. 47, 264/154; 162/117, 146, 205, 206

[56] References Cited

FOREIGN PATENT DOCUMENTS

| | | | |
|---|---|---|---|
| 2102641 | 4/1972 | France | 264/284 |
| 49-126779 | 12/1974 | Japan | 264/284 |
| 868651 | 5/1961 | United Kingdom . | |
| 891943 | 3/1962 | United Kingdom . | |
| 891945 | 3/1962 | United Kingdom . | |
| 1262531 | 2/1972 | United Kingdom . | |
| 1287917 | 9/1972 | United Kingdom . | |
| 1355912 | 6/1974 | United Kingdom . | |
| 1355913 | 6/1974 | United Kingdom . | |
| 1423967 | 2/1976 | United Kingdom . | |

*Primary Examiner*—James B. Lowe

[57] ABSTRACT

Permanently embossed, highly porous wallpapers are produced by preparing a sheet from a mixture of up to 90% by weight of cellulose fibers and at least 10% by weight of fibrils of at least one thermoplastic polymer, and subjecting the sheet, in any order, to the following operations:

(a) embossing at a temperature lower than the softening temperature of the thermoplastic fiber; and
(b) heating at a temperature equal to or higher than the softening temperature of the thermoplastic polymer.

The term "fibrils" refers to elongated structures in the form of films or fibers of varying length comprised between about 1.0 mm and about 50 mm and the minor diameter or dimension of which is comprised between about 1.0 and 400 micron.

4 Claims, No Drawings

PREPARING PERMANENTLY EMBOSSED, HIGHLY POROUS WALLPAPERS

This is a Div. of application Ser. No. 808,570, filed June 21, 1977, now abandoned.

THE PRIOR ART

At present, fibrils of synthetic polymers having a surface area (or specific surface) greater than 1 $m^2/g$ are used, alone or in admixture with cellulose fibers, to prepare synthetic or semi-synthetic paper or paper-like products. Because of the thermoplastic characteristics of the fibrils comprised therein, the paper and paper-like products can be modified, by heat treatments with or without pressure, either for purposes of reinforcement and dimensional stabilization, or for decorative purposes.

According to French Pat. No. 2,128,750, the surface of sheets consisting totally or in part of thermoplastic fibrils, may be modified by means of embossing carried out by passing the material between cylinders with raised motifs, heated to the melt temperature of the polymer of which the fibrils are formed.

According to British Pat. No. 1,423,967 a process is provided for producing wallpaper with permanent embossing, which comprises the steps of preparing a sheet comprising up to 90% of a cellulosic pulp and at least 10% of synthetic polymer fibrils, heating the sheet to melt the fibrils and then embossing the heated sheet.

Embossing methods of the kind disclosed in the aforementioned patents give rise to deeply embossed sheets which however possess an extremely reduced porosity, whereas porosity and transpirability are requisites of considerable importance in wallpapers.

THE PRESENT INVENTION

An object of this invention is to provide a process for preparing wallpaper which is both permanently and deeply embossed and highly porous.

That and other objects as will appear hereinafter are accomplished, according to this invention, by carrying out the embossing operation on a sheet comprising up to 90% of cellulose fibers and at least 10% of fibrils of at least one thermoplastic polymer at a temperature lower than the softening temperature of said thermoplastic polymer, the embossing being carried out either before or after the heating operation by which the thermoplastic fibrils are softened or melted.

Thus, the process of the invention comprises:

(1) preparing a sheet from a mixture comprising up to 90% by weight of cellulose fibers and at least 10% by weight of fibrils of at least one thermoplastic polymer, said fibrils having a surface area greater than 1 $m^2/g$, (2) subjecting the sheet to the following operations (a) and (b), in whatever sequence:

(a) embossing at a temperature below the softening temperature of the thermoplastic polymer, (b) heating at a temperature at least equal to the softening temperature of the thermoplastic polymer.

The fibrils used in the process of the present invention may consist of homopolymers of monomers such as olefins (f.i. low and high-density polyethylene, polypropylene, poly(4-methyl-1-pentene), acrylonitrile, vinylchloride and vinyl monomers in general, amides, as well as of acrylic resins, polyester resins, polyurethanes, polycarbonates, polyethers, and of the copolymers formed from said copolymerizables monomers.

The fibrils used in this process may be obtained according to any of the numerous processes known in the art, as for instance, the methods described in British Pat. Nos. 868,651 and 1,287,917. According to those patents, the fibers in question, otherwise also called "fibrids", are obtained by precipitation of polymers from their solutions, or during the polymerization of the monomer itself, operating in the presence of shearing stresses. The methods described in British Pat. Nos. 891,943 and 1,262,531, Belgian Pat. No. 789,808, French Pat. No. 2,176,858 and German Pat. Application No. 2,434,543, can also be used. According to said patents the fibrils are obtained in the state of more or less coherent aggregates or fibrillated filament-like structures (plexofilaments) by extruding solutions, emulsions or dispersions of the polymers in one or more liquid media through an orifice under conditions of almost instantaneous evaporation of the liquid phase present (flash-spinning processes). In this case, the fibrous aggregates or plexofilaments obtained may be easily disgregated into discontinuous fibrils or elementary fibrils, displaying a surface area greater than 1 sq.m/g, by means of shearing and/or beating operations as described, for instance, in British Pat. No. 891,945. Other methods by which it is possible to obtain directly fibrils suitable for use in the process of this invention, are those described in Italian Pat. No. 947,919 and Italian Pat. Application No. 29594 A/74, both assigned to Montedison, S.p.A., as well as in British Pat. Nos. 1,355,912 and 1,335,913.

The fibrils used may have incorporated therein, inorganic fillers such as: kaolin, talcum powder, calcium sulphate, titanium dioxide and other inert materials. Said fillers may be introduced into the fibrils during the course of their forming, as described in Italian Pat. No. 947,919.

For the purposes of this invention, the quantity of inorganic filler in each fibril may amount to from 1% up to 70% by weight of the total weight of the fibril, the remainder at least 30%, consisting of the thermoplastic polymer.

The cellulose fibers used in the preparation of the sheet according to step (1) may be derived totally from mechanical cellulose pulp or from chemical or semichemical cellulose pulp, or they may also be derived from mixes of these different types of cellulose.

The weight ratio between cellulose fibers and thermoplastic fibrils in the above mentioned sheet, may vary from 90:10 to 10:90, but preferably is maintained between 70:30 and 30:70.

The preparation of the sheet according to step (1) may be carried out according to conventional techniques of the paper industry, starting from either an aqueous suspension or a suspension in any other inert liquid medium, of a mixture of the cellulose fibers and the fibrils, using continuous or discontinuous machines. Preferably, there are used aqueous suspensions containing from 0.7 to 1.5% by weight of total fibrous material to which may be added the common additives used in the conventional preparation of paper, such as for instance glueing agents, natural or synthetic, and inorganic fillers such as kaolin, talcum powder, titanium dioxide, etc.

During its preparation, the sheet may be subjected to a "size press" operation in order to improve its printability and its surface characteristics.

On the other hand, said operation may also be carried out by using a titanium dioxide suspension or a suspension of other pigments displaying a high covering and dulling power, at concentrations comprised between 10 and 50 g/l, in suitable solutions of natural or synthetic binders.

Said surface treatment, similar to a coating operation, serves to favor the successive surface treatments, particularly the printing, to which the sheet may possibly be subjected.

The process of the present invention can be carried out for example, by first subjecting the sheet obtained in step (1) to the embossing operation (a) under the above-specified temperature conditions, and then subjecting the embossed sheet to the heating operation (b). When this method is used it is preferable, but not strictly necessary, for the sheet to contain, at the moment when it is subjected to the embossing operation, water in an amount comprised between 2% and 10%, but preferably between 4% and 6%, on the total weight of the sheet. This degree of humidity may be attained by passing the sheet through a drying oven maintained at a temperature that is lower than the softening temperature of the thermoplastic polymer from which the fibers are made.

According to another embodiment of the invention, the process is carried out by first subjecting the sheet obtained in step (1) to the heating operation (b), then cooling the sheet to a temperature lower than the softening temperature of the thermoplastic polymer, and finally subjecting the sheet to the embossing operation (a).

Whatever embodiment of the process of the invention is used, the embossing operation (a) is carried out at a temperature that is lower than the softening temperature of the thermoplactic polymer or (in the case that fibrils of different thermoplastic polymers have been used for preparing the sheet), at a temperature lower than the softening temperature of the thermoplastic polymer having the lowest softening temperature. Accordingly, the embossing can be carried out at room temperature, or lower. The embossing operation may be preceded by a printing operation on the sheet according to the usual techniques such as rotogravure, flexography, etc.

The embossing operation can be carried out by passing the sheet between two cylinders (rollers) of which one is an embossing cylinder that in general is made of steel, while the other cylinder is a contrasting one and may be made of hard rubber, for instance of neoprene, or of paper-wool.

The contrasting cylinder may, in its turn, be smooth or embossed with a relief or embossing that will be complementary to the other cylinder.

The pressure exerted on the sheet depends on the thickness and on the physical characteristics of the sheet itself; in most cases at any rate there are achieved good results with operational pressures comprised between 10 and 10 kg/cm$^2$.

The heating operation (b), which can be carried out either before or after the embossing operation (a), serves the purpose of causing the softening or the melting of the thermoplastic fibrils present in the sheet, whereby a very high porosity develops therein.

Said operation may be achieved by passing the sheet through an oven or under a set of infrared lamps or even on the surface of a heated roller. The heating temperature must be at least equal to the softening temperature of the polymer from which the fibrils are made.

Preferably one operates at a temperature at which melting of the thermoplastic polymer occurs, or higher. Temperatures higher by at least 5° C., but generally higher by 20°–40° C., than the melting temperature of the thermoplastic polymer from which the fibrils are made are preferred.

In case the starting sheet has been prepared by using fibrils of different thermoplastic polymers, it is preferable to carry out the heating at a temperature at least equal to the softening temperature of the polymer having the highest softening point.

The duration of the heating must be sufficient for softening or, preferably, melting at least a part of the fibrils incorporated in the sheet. It is sufficient, thus, for the purposes of this invention that only the surface of the sheet be brought up to a temperature at least equal to the softening temperature of the thermoplastic polymer.

After both operations of embossing and heating, the sheet may be subjected to further decorating and/or printing processes, and, moreover, it is provided on the side that will adhere to the wall, with a suitable adhesive.

The following examples are given to illustrate the invention in grater detail, and are not intended to be limiting.

EXAMPLE 1

There was prepared a 1.5% by weight aqueous suspension of a mixture of fibers consisting of:

50% by weight of conifer cellulose pulp,

50% by weight of fibrils of polyethylene of the high density type having a melt index (M.I.) of 5, a softening temperature of 118° C. and a melting temperature of 135° C.

The aqueous suspension or dispersion of the cellulose fibers and polyethylene fibrils contained 3% by weight of a sodium resin (glue) and 7% by weight of homogeneously dispersed powdered kaolin.

The polyethylene fibrils contained incorporated therein, 30% by weight of kaolin, had a length comprised between 1.4 and 1.6 mm, an apparent diameter (mean diameter) comprised between 15 and 25 micron, and surface area of about 5 m$^2$/g.

The fibrils were prepared starting from a solution of said polyethylene in n-hexane, containing 30% by weight of kaolin having a mean granulometry of around 1.5 micron, by means of "flash-spinning" under the action of a high-speed angled gas jet, according to the process described in Italian Pat. No. 947,919.

Using a continuous paper-making machine, the aqueous suspension or dispersion of cellulose fibers and polyethylene fibrils was formed into a 150 g/m$^2$ sheet having a volume of 1.95 cc/g. Said sheet was then left to dry at room temperature until it reached a humidity content of about 6%, whereupon the sheet was embossed by passing it continuously, at a constant speed, between an embossed steel cylinder and a resilient paper-wool cylinder having a hardness of 90° S.A. The pressure exerted on the sheet amounted to 50 kg/cm$^2$.

During the embossing operation, both the sheet and the two cylinders were kept at 20° C. The sheet thus obtained had an embossing which strictly reproduced, also in depth, the pattern of the surface of the embossing cylinder.

The embossed sheet was then conveyed into an oven heated at 160° C., where it remained for 6 seconds, after which time the sheet was removed from the oven, cooled down, wound on reels and transformed into coils usuable for the various applications.

The characteristics of the sheets thus prepared are recorded in Table I.

EXAMPLE 2

An aqueous dispersion at 1.5% by weight concentration was prepared of a mixture of fibers, consisting of:

20% by weight of coniferous cellulose fibers;

45% by weight of latifolia cellulosic fibers;

35% by weight of fibrils of polyethylene of the high density type, having a M.I. of 20, a softening temperature of 118° C. and a melting temperature of 135° C.

The polyethylene fibrils did not contain incorporated therein fillers of any sort. They had a length comprised between 1.4 and 1.6 mm, an apparent (mean) diameter comprised between 15 and 25 micron and a surface area of about 5 sq.m/g. Said fibrils were prepared in the same way as those used in Example 1, except the absence of kaolin.

The aqueous fiber dispersion had mixed therewith 3% by weight of a sodium resin and 10% by weight of powdered kaolin.

From this homogeneous dispersion, there was prepared, using a continuous paper machine, a 150 g/sq.m sheet which was then treated on the same machine with "size-press", using an aqueous 2% solution of natural starches in order to improve the surface receptivity to inks.

The sheet, which had a volume of 1.5 cc/g. was then printed on a conventional six-color rotogravure printing machine, and finally was embossed at a temperature of 20° C. at a humidity of about 10% by passing it between an embossing steel cylinder and a resilient neoprene cylinder having a hardness of 60° S.A. at an operating pressure of 100 kg/sq.cm. The embossed sheet was passed into a hot air oven heated at 175° C., where it remained at that temperature for 5 seconds, after which it was cooled and wound.

The characteristics of the sheet thus obtained are reported in Table I.

EXAMPLE 3

By mixed beating to 30° S.R. there was prepared an aqueous 1% dispersion of fibers consisting of:

15% by weight of coniferous cellulose,

15% by weight of latifolia cellulose and

70% by weight of fibrils of polypropylene having an isotactic index of 90%, M.I. of 10, a softening temperature of 130° C. and a melting temperature of 170° C.

The aqueous fiber dispersion contained 3.2% of sodium resin and 5% of kaolin dispersed in the former.

The fibrils were produced according to the process described in the preceding examples; they contained 40% of incorporated kaolin and had an average length of around 1.5 mm., apparent (mean) diameter of about 20 micron and a surface area of about 3.5 $m^2/g$.

Using a continuous flat-table machine having a width of 2.5 m and an operating speed of 150 m/min., the dispersion was formed into a sheet of 150 g/sq.m., and having a volume of 1.95 cc/g.

The sheet was embossed at room temperature, by passing it over an embossing cylinder coupled to an opposing paper-wool roller. The pressure exerted on the sheet amounted to 90 $kg/cm^2$. The sheet thus obtained was passed between plates heated by infrared rays so as to attain 200° C., and keep this temperature for about 5 seconds, after which time it was again cooled and wound up on a reel before final packaging.

The characteristics of the sheet thus obtained are reported in Table I.

EXAMPLE 4

On a standard (conventional) paper machine, through mixed beating at 28° S.R., there was prepared an aqueous 1.5% by weight dispersion of a fiber mixture formed of:

25% by weight of conifer cellulose pulp,

25% by weight of latifolia cellulose pulp,

8% by weight of wood pulp, and

42% by weight of fibrils of polyethylene of the high density type, having a M.I. of 30, a melting temperature of 135° C. and a softening temperature of 118° C.

The aqueous fiber dispersion contained 2% by weight of sodium resinate and 1% by weight of Aquapel (adhesives).

The fibrils contained, incorporated therein, 30% by weight of kaolin and had a mean weight length of 1.6 mm, an apparent diameter (mean diameter) of 18 micron and a surface area of about 5 $m^2/g$.

Said fibrils had been prepared starting from a solution of the polyethylene in n-hexane, containing 30% by weight of kaolin with a mean granulometry of around 1.5 micron, by means of "flash-spinning" under the action of an angled high-speed gas jet, according to the process described in Italian Pat. No. 947,919.

By using a continuous, flat-table machine, 2.5 m wide, at an operating speed of 150 m/minute, the dispersion was formed into a sheet having a weight of 150 g/sq.m.

Said sheet, which had a volume of 1.80 cc/g, was then passed through a forced hot air oven at a speed of 50 m/minute and at a temperature of 140° C. The dwell period in the oven equalled 10 seconds. The sheet was then cooled to room temperature (25° C.), thereupon it was embossed by passing it between an embossing steel roller and a resilient paper-wool cylinder having a hardness of 90° S.A. at the same room temperature. The pressure exerted on the sheet amounted to 50 kg/linear cm.

The finished sheet was then wound to coils and cut up to final rolls.

The characteristics of the sheet are reported in Table I.

EXAMPLE 5

Following the procedures of Example 1, sheet was prepared containing 55% by weight of synthetic polypropylene fibrils (Melt Index 20, softening temperature 122° C., melting temperature 168° C.) and having a mean length of 1.8 mm, an apparent or mean diameter of 25 micron and surface area of about 6 sq.m/g. Such synthetic fibrils, prepared according to the technology described in Italian Pat. No. 947,919, contain incorporated in them 30% by weight of kaolin having a mean granulometry of about 1.5 micron.

During the preparation stage on the flat plane machine, the sheet was treated in a size-press with an aqueous solution of starch containing in suspension 50 g/l of $TiO_2$, with the purpose of obtaining a sheet with good surface properties and characteristics.

The sheet thus obtained had a volume of 1.9 cc/g. Said sheet was passed through an infrared radiation device at the rate of 50 m/min., which brought it to a temperature of 178° C.

At the outlet of the infrared plate, the sheet was subjected to a smoothing operation in order to improve its printability, by passing the sheet, while the synthetic material was still in the thermoplastic phase, between two rollers of a calander, one of the rollers being of smooth, sanded steel and cooled with $H_2O$, while the other roller was made of rubber having a hardness of 65 S.A.

The sheet thus obtained had a printable surface, with a smoothness equal to 85 cc/min. (measured according to the ATICELCA MC 16 Standards). It was left to cool down and was then subjected to printing on a rotogravure six-color machine, after which it was trimmed.

The embossing operation was carried out continuously, at the same speed as the printing speed (125 m/min.) between two rollers, one of steel and carrying engraved thereon the pattern to be reproduced, the other made of paper-wool and carrying the negative of the pattern to be embossed. The cylinders and the sheet are kept at a temperature of 23° C. The pressure exerted on the sheet amounted to about 50 Kg./linear cm.

The characteristics of the sheet thus obtained are reported in Table I.

TABLE I

| CHARACTERISTICS | Measurement unit | Example 1 | Example 2 | Example 3 | Example 4 | Example 5 |
|---|---|---|---|---|---|---|
| Weight | $g/m^2$ | 149.7 | 141.2 | 145. | 133.5 | 143.2 |
| Thickness | microns | 357. | 300. | 340. | 231. | 282. |
| Longitudinal breaking load in dry condition | Kg. | 5.48 | 9.17 | 4.18 | 5.58 | 6.31 |
| Transvers. breaking load, dry condition | Kg. | 3.15 | 5.27 | 2.68 | 3.08 | 3.20 |
| Longitudinal breaking load, wet condition | Kg. | 2.83 | 3.73 | 3.98 | 2.80 | 3.64 |
| Tranvers. breaking load, wet condition | Kg. | 1.89 | 2.42 | 2.17 | 1.7 | 1.8 |
| Residual longitudinal resistance | % | 52. | 41. | 95. | 49. | 57.6 |
| Residual transvers. resistance | % | 60. | 46. | 81. | 45. | 43.7 |
| Longitudinal elongation | % | 1.5 | 1.6 | 1.3 | 1.9 | 1.56 |
| Transversal elongation | % | 4.6 | 4.5 | 2.7 | 4.8 | not determined |
| Permeability to water | $\frac{g.mm}{m^2 24h}$ | 376. | 374. | 410. | 367. | 400. |
| Permeability to vapor | $\frac{g.mm}{m^2 24h}$ | 175. | 113. | 196. | 158. | 202. |
| Bendtsen porosity to air (measured according to ATICELCA MC 19 Standards) | cc/min. | 941 ± 41 | 700 ± 85 | 1100 ± 70 | 850 ± 41 | 950 ± 45 |
| Loss of embossing | cycles | 70 | 30 | 700 | 50 | 100 |
| Tearing in the wet | cycles | 128 | 60 | 1000 | 90 | 300 |

What we claim is:

1. Process for the preparation of permanently embossed, highly porous wallpaper, which process comprises:

(1) preparing a sheet from a mixture comprising up to 90% by weight of cellulose fibers and at least 10% by weight of fibrils of at least one thermoplastic polymer, said fibrils having a surface area greater than 1 $m^2/g$, and (2) subjecting the sheet to the following operations (a) and (b), in whatever sequence:

(a) embossing the sheet while the sheet is at a temperature lower than the softening temperature of said thermoplastic polymer, (b) heating the sheet while the sheet is at a temperature equal to or higher than the softening temperature of said thermoplastic polymer, for a time sufficient to melt at least a part of the fibrils incorporated in the sheet.

2. The process of claim 1, in which the heating is carried out at a temperature at least 5° C. higher than the melting temperature of the thermoplastic polymer.

3. The process of claim 1 in which the sheet is embossed while the sheet is at about room temperature.

4. The process of claim 1 in which the sheet which is embossed has a moisture content of from 2% to 10% by weight based on the total weight of the sheet.

* * * * *